United States Patent
Smeets et al.

(10) Patent No.: US 6,238,313 B1
(45) Date of Patent: May 29, 2001

(54) DRIVE BELT

(75) Inventors: Paulus Maria Smeets; Wilhelmus Peter Catharina Peters, both of Tilburg; Johannes Hendrikus Lith, Berlicum, all of (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/364,076

(22) Filed: Jul. 30, 1999

(30) Foreign Application Priority Data

Jul. 30, 1998 (EP) .................................................. 98202567

(51) Int. Cl.$^7$ ................................. F16G 1/22; F16G 5/16
(52) U.S. Cl. ........................ 474/244; 474/242; 474/240; 474/201
(58) Field of Search ..................................... 474/201, 242, 474/237, 240, 245, 265, 279, 903

(56) References Cited

U.S. PATENT DOCUMENTS

| 4,596,536 | 6/1986 | Okawa et al. |
| 4,610,648 | * 9/1986 | Miranti, Jr. .......................... 474/242 |
| 4,617,007 | * 10/1986 | Miranti, Jr. et al. ................. 474/201 |
| 4,826,473 | * 5/1989 | Miyawaki ............................. 474/240 |
| 4,832,671 | * 5/1989 | Satoh ................................. 474/201 X |
| 4,854,919 | 8/1989 | van Lith . |
| 4,976,663 | * 12/1990 | Hendrikus ........................... 474/242 |
| 5,004,450 | 4/1991 | Ide . |
| 5,439,422 | * 8/1995 | Smeets ................................. 474/242 |

FOREIGN PATENT DOCUMENTS

| 0 626 526 | 11/1994 | (EP) . |
| 167896 | 10/1986 | (JP) . |
| 8-021488 | 1/1996 | (JP) . |

* cited by examiner

*Primary Examiner*—David A. Bucci
*Assistant Examiner*—Marcus Charles
(74) *Attorney, Agent, or Firm*—Young & Thompson

(57) ABSTRACT

A drive belt for use in a continuously variable transmission includes a plurality of transverse elements carried by at least one endless carrier with at least one endless band, received in a receiving shot provided for the band in the element, the slot allowing relative axial play Pa between the element and the band relative to the predominant longitudinal direction of the belt, wherein the axial play is of a value between 0.2 and 0.95 times the maximum amount of misalignment defined for the belt, indicated in maximum amount of lateral displacement.

18 Claims, 2 Drawing Sheets

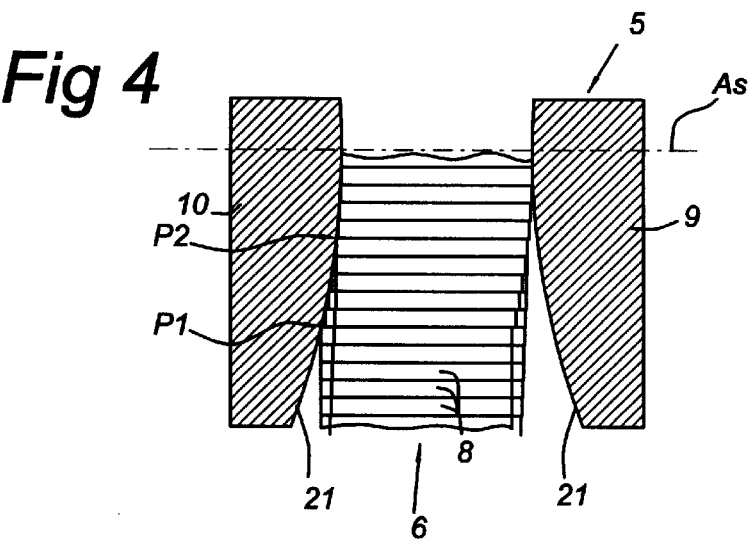
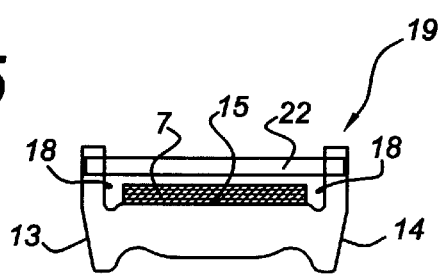
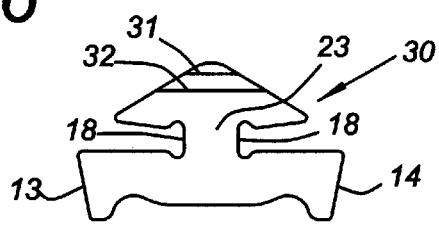
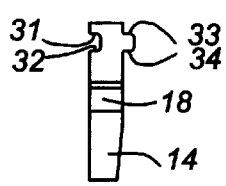
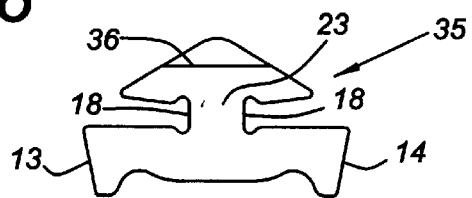
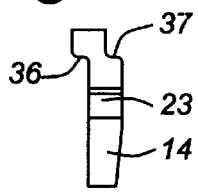

US 6,238,313 B1

DRIVE BELT

BACKGROUND OF THE INVENTION

The present invention relates to a drive.

DESCRIPTION OF THE RELATED ART

Such a drive belt is known from the publication of U.S. Pat. No. 5,004,450. In the construction known from this publication, the height, i.e. the radial length of the contact faces of a transverse element is defined such, relative to the width of the element that a stable positioning between the sheaves of a pulley of the element is obtained, i.e. within a plane at right angles to the longitudinal direction of the belt.

From European patent publication EP-A-0626526, it is further known that, due to the so called misalignment phenomenon, elements of a belt adversely tend to enter a pulley at an angle relative to said pre-mentioned plane at a right angle to the longitudinal direction. This misalignment phenomenon, e.g. from U.S. Pat. No. 4,854,919, represents that the belt, at certain transmission ratios, is not at a right angle relative to the axis of rotation of a pulley. This geometrical characteristic may occur during operation of the belt in pulleys of which only one sheave is made axially moveable, as is practised in commercially produced transmissions. From said European document it is known to limit the possible rotation of the transverse elements through geometrically limiting the arc tangent between a specified transverse width within an element and the amount of radial play allowed to a carrier therefor. A disadvantage of this known construction is that in certain belt/pulley arrangements the elements still appear to enter a pulley adversely. Moreover, the known construction requires the projection and recess part, as usually applied in the head part of an element, to be shaped such that a recess may take up a projection with lateral play. Such a shape is difficult to produce.

SUMMARY OF THE INVENTION

It is the object of the invention to arrive at alternatively defined belt geometry, realising a properly and durably functioning belt with a majority of imaginable belt/pulley combinations as used in the automotive field. A belt of the invention is provided with such features is capable of operating correctly in combination with a large number of pulley sets having varying pulley centre distances within a range as practised in the automotive area. Particularly, the present solution provides that between one longitudinal end of a belt, i.e. when seen in plan view, and the other end of the other pulley of a set, all elements may remain running in a virtually straight line, i.e. without being bent off from its direction when entered in a pulley. This effect has been made possible by defining the claimed minimum and appropriate axial play of a carrier within a receiving slot of an element. By this construction, elements tend to be guided laterally between two pulleys, so that significantly the sensitively of a belt for misalignment is reduced. In particular the impact of an element on a sheave, when entering a pulley is minimised. Also the invention reduces the level of created noise in the transmission, as well as the loss of kinetic energy in the belt.

In utilising the carrier as a guiding element, i.e. by allowing contact between a carrier and an element neck, the present invention overcomes the technical prejudice in the field of continuously variable transmission technology, that contacts between a carrier side and a neck part should not be allowed because of risk of deterioration of the carrier through burring, and hence the risk of failure of a belt within a commercialised transmission. This prejudice is overcome by the acknowledgement of technical progress, in rounding and hardening the neck part and the belt sides, and by realising that an element within an arrangement according to the invention is only gradually moved axially during it's path between two pulleys, without large impact and without any force load of the element. Thus, the rise of adverse mutual contacting of carrier and element neck is minimal. Also, it is recognised that within one pulley to be exited by an element, the carrier will already move axially to compensate for misalignment, whereas the element is forced straight forward until it is released from the sheaves of a pulley. In constructions according to the invention, at leaving a pulley, the element neck and a belt side may virtually be contiguous, i.e. with minimal play, so that also the impact there between is kept minimal.

Additionally, the reduction in amount of play recognised by the invention provides an improved freedom of design, advantageously usable in reducing the width of the elements and therewith the weight of the belt, strengthening the neck part of an element or, increasing the width of a carrier within the same element. As to the latter possibility typically, with a belt according to the invention, having a width of 24 mm, a known play of e.g. 1.2 mm may be reduced to 0.2 mm. The width of a carrier may thereby e.g. being increased from 8.75 to 10.1 mm, totalling 20.2 mm of carrier within commonly practised belt types.

It is remarked that from the Patent abstracts of Japan publication NR. 08021488, in a belt type having two separate carriers, it is known per se to minimise clearance or play between a neck part and a carrier side. In the construction known from this document the minimised play is taught to be asymmetrically set to 0.7 mm for one carrier and to 1.3 mm to the other, totalling a play of 2 mm.

The present invention also points away from the construction known from the Japanese patent application No. 167896/1986, indicating that clearance between a so called pillar and the ring side edge should be above the value of misalignment.

BRIEF DESCRIPTION OF THE DRAWINGS

The invention will further be explained with reference to a drawing wherein:

FIG. 4 shows a top view of a drive belt running misaligned into a pulley, the running of a belt according to the invention being shown in thickened lines;

FIG. 5 depicts in a view corresponding to FIG. 2 an alternative, single carrier embodiment of an element, capable of receiving the improvement according to the invention;

FIG. 6 is a schematic representation in front elevation of a first new embodiment of a transverse element, the application of which in a belt, is technically rendered feasible through the present invention;

FIG. 7 is a side elevation of the element according to FIG. 6;

FIG. 8 is a representation according to FIG. 5 of a second new embodiment of a transverse element; and FIG. 9 is a side elevation of the element according to FIG. 8.

DESCRIPTION OF THE PREFERRED EMBODIMENTS

Figure 1:
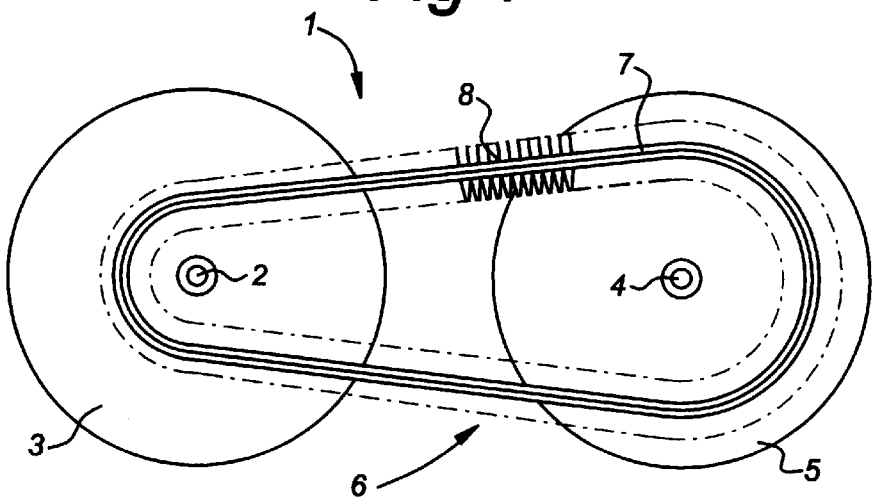
FIG. 1 shows in a cross-section at right angles to the direction of ingoing and outgoing axes, a diagrammatic representation of a continuously variable transmission with a metal drive belt.

The continuously variable transmission 1 shown diagrammatically in FIG. 1 comprises a pulley 3 disposed on a first shaft 2, a pulley 5 disposed on a second shaft 4, and a drive belt 6 positioned around the pulleys 3, 5. The drive belt 6 comprises one or more endless carriers 7, which carriers themselves can consist of one or more rings, alternatively denoted bands, combined in a nested manner to the form of a carrier. Transverse elements 8 are disposed on the carriers 7, which elements generally slide over the carriers 7. It is assumed here that the way in which the continuously variable transmission 1 works is generally known.

Figure 2:
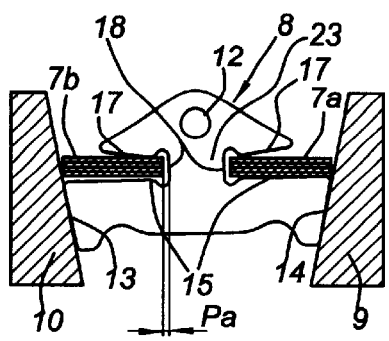
FIG. 2 shows a drive belt in cross section, wedged between the sheaves of a pulley.

FIG. 2 shows in a radial cross section of a pulley, a transverse element 8 wedged between the sheaves 9, 10 of the pulley. The element 8 is provided with two slots suitably shaped for receiving a carrier 7a or 7b. The slot in the present embodiment is situated above flanks 13 and 14 for contacting the sheaves 9 and 10 of a pulley 3 or 5. A slot shows a bearing surface 15 of a body part of an element 8, a top surface 17 and a side surface 18 of a neck part 23 of the element 8. In this embodiment, the opening for receiving a carrier 7a, 7b, is axially defined by the rim 18 of the neck part 23 on the one hand, and by the axial end of the opening near a flank 13 or 14 on the other hand.

The transverse elements 8 are generally also provided with a projection 12 on one face and with a recess, not shown in the figures, on the opposite face. In the known construction the projection and recess 12 are formed with rounded shapes, allowing mutual rotation of the elements 8. A somewhat slotted shape of the recess allows both a small axial amount of mutual movement of neighbouring elements 8, and a limitation thereof. Thus, the projection and recesses of adjacent transverse elements 8 engage with each other and, in the known construction guide both the translation and the rotation of the elements 8.

Figure 3:
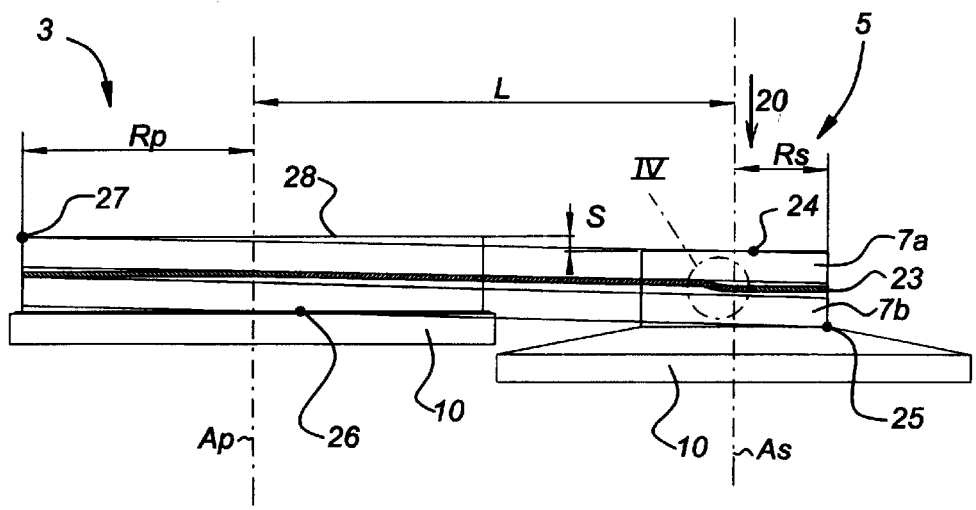
FIG. 3 shows a diagrammatic representation of a top view of a belt running misaligned between a pair of sheave, one of which sheave being omitted from the figure.

FIG. 3 is a schematic plan view of a variator, i.e. a belt mounted in a set of pulleys 3 and 5. For conveniency of representation, only one sheave of each pulley is represented. The variator is shown in an extreme position of misalignment, which may be expressed in an amount of axial displacement S between the pulleys 3 and 5. In this position, the radius Rs of the circle of contact between belt 6 and secondary pulley 5 is small relative to that of the corresponding radius Rp at the primary pulley 3. However, the same amount of misalignment is encountered at a transmission ratio with the radii being reversed in measure. In the figure, the cross-elements 8 of the belt 6 are referred to by their neck part 23. In other figures it is shown that the neck part 23 has side walls 18 limiting axial displacement of a carrier 7. The present figure further shows that within a pulley 3 or 5, the carriers 7a and 7b, from one outer variator side to the other outer variator side, run in a straight line at a sharp angle to an imaginary line 28 at right angles to axial direction 20. The axial direction 20 is that of the axis Ap of the primary pulley 3 and of the secondary axis As. The centre distance between the pulleys, i.e. between Ap and As is denoted L. The axial displacement of an element during its movement from one pulley to the other is made possible by the provision of axial play Pa for a carrier 7, within the receiving slot of a transverse element. The axial play Pa of a transverse element 8 relative to its carrier or carriers 7a, 7b is confined within the boundaries of a first element part 18 extending substantially transversely to the longitudinal direction of the band and to a substantially flat surface side thereof, and by a second corresponding element part 18 or by an axial end 13, 14 of the element 8, for contacting a pulley surface 21.

As explained in detail in e.g. U.S. Patent Specification U.S. Pat. No. 4,854,919, the geometrical shape of the continuously variable transmission will often cause the drive belt 6 to run out of true into the pulley 3. The consequences of this running out of true can to a large extend be overcome by measures known per se e.g. according to said us U.S. Patent Specification. The running out of true does cause the transverse elements 8 of the drive belt 6 to come into contact first with the sheave 9. At that instance there is no contact yet with sheave 10. As a result, in the known construction the transverse element 8 will be given an impulse in the direction of the sheave 10 and will consequently move in the direction of sheave 10 and may, disadvantageously cause the element 8 to rotate.

The described impulse received by an element 8 when first contacting a sheave 9, or 10 of a pulley 3 or 5 is known to cause a noise felt as a draw back of the metal push belt type of transmission. This is even more perceived so in applications for luxury cars, which for reason of comfort traditionally have been fitted with automatic transmissions. The level of noise of conventional push belt transmissions up to now has impeded the penetration of the push belt transmission type in the existing market for automatic transmissions.

In the construction according to the invention, this amount of noise is reduced. Also, at least the axial guiding function of a projection and recess is made obsolete by the present invention. It will be shown that in a construction according to the invention, the possible functions of a projection are advantageously limited to that of a mutual radial positioning of neighbouring elements in a belt. The invention advantageously overcomes the undesired side-effects of out-of-true positions of a belt 6, by guiding an element 8 to an improved position before wedging in a pulley and thereby arrives at an optimised belt design.

The present invention acknowledges the circumstance that, as wedged in a pulley, the elements 8 of a belt 6 are forced in a straight line at right angles to the axial direction. In between the pulley's 3, 5 however, the elements 8, indicated in FIG. 3 by their neck-part 23, run in an at least predominantly straight line at a sharp angle relative to said axial direction. The angle is defined trough distances L and S. It is also noticed according the idea underlying the invention, that the carrier or carriers 7 are not capable of taking up bendings transverse to their longitudinal direction within the same plane of the carrier. This is shown in FIG. 3 by the straight lines wherein carriers 7 are drawn. In practise the carriers 7 deal with the shown amount of misalignment S, alternatively denoted skewing S, by the convex shape of the saddles 15 and, possibly a minor amount of torsion. The above observations, according to the invention lead to the conclusion that the carriers 7 are within a variator constrained by, as seen in the plan view of FIG. 3, the outermost points 24, 25 in pulley 5 the points 26, 27 in pulley 3 of the respective contacting radi Rs, Rp of the belt 6 and by the upstanding wall of e.g. a neck put 23 of an element 8. It was further observed that, once having left the primary pulley 3, the elements 8, i.e. the neck parts 23 in FIG. 3, tend to remain in the direction given by the same pulley 3. As indicated in FIG. 3, and according to the invention, the total amount of axial play for a neck part 23 is set such that at the largest possible amount of misalignment S in a transmission, the elements 8 may run in their forced straight line, whereas the carriers 7 may run skewed without the two hindering one another. The carriers 7 are in an outermost end of the contacting circle bound by a point of contact 27 with the non shown sheave 9 or with a neck part 23, and at the innermost side of the pulley by a neck part 23 or by point of contact 26 respectively. In such design, after having left the pulley 3, the elements 8 are smoothly guided in axial direction by a carrier, in this case carrier 7a, towards the other pulley 5. It is at the point of entrance where the construction according to the invention finds its greatest advantage, as will be shown by FIG. 4.

FIG. 4 shows, in a horizontal cross section of part of pulley 5, the entrance of a belt according to the state of the art, where the described guidance of an element 8 by a carrier 7 is absent. An element 8 then enters pulley 5 at point P1. With the construction according to the invention, the belt enters a pulley as indicated by the thicker lines at point 2. The point of entrance P2 now lies further ahead in the pulley so that the remaining amount of required axial movement of an element 8 is less than compared to the axial movement of a state of the art belt. This phenomenon significantly reduces the axial impulse received by an element when contacting a sheave since the line of entrance of a belt 6 on a contacting surface 21 is shaped circularly. Therefor the remaining amount of misalignment reduces with the cosine of the point of contact relative to the centre of said circular line of entrance as seen in plan view. Moreover, the impulse at right angles with the predominant longitudinal direction of the belt, i.e. in rotational direction of the sheave, at least partly causing the contacting element 8 to tend to rotate, reduces linearly with the distance of the point of contact P1 or P2 to the axis As of the relevant sheave. These phenomena of remarkably lower impact on the elements reduce the adverse effects of misalignment and the noise generated by a variator.

FIG. 5 depicts a cross-section of a belt with a single carrier type of element 19, provided with a single carrier 7 which, to its upper side, is locked in its slot by a closing element 22. The principle of guiding the elements 19 of the depicted push belt embodiment and the assessment of maximum amount of play are analogous to that of the above described embodiment with two carriers.

FIGS. 6 and 8 depict in a front view according to that of FIG. 2 and of FIG. 5, a simplified element 30 and 35, made possible by the present invention. Instead of more or less rounded shapes of a projection and recess 12 as in element 8, the new embodiments 30 and 35 show axially extended contact surfaces 31–34 and 36, 37 for mutual contact between consequtive elements in a belt, limiting radial movement of at least one such element 30, 35 in at least one radial direction. The contact surfaces 31–34 and 35, 36 extend over the entire local width of the element.

FIGS. 7 and 9 respectively show these elements 30, 35 in a side elevation. Since the function of axial guidance of elements by the projection/recess 12 during the cross over from one pulley to the other is according to the invention taken over by the upstanding walls 18 of a slot for a carrier 7, it is according to a further development of the invention concluded that the more or less round shaped known recess 12 may be replaced by an axially extending groove and ridge, with upper and lower contacting surfaces 31, 32, preferably somewhat round shaped as seen in side elevation. A projecting ridge at the other side of the element 30 is shaped conformingly. Such groove-like deformation of the element is much easier to realise than the hole-like recess/projection according to the state of art. In yet a further development, only one plane of contact 36 in radial direction is created, co-operating with a confirmingly shaped plane of contact of an adjacement element 35, and further simplifying the form and way of production of an element. In this embodiment the elements 35 of a belt lock up each other once entered in a belt.

In both embodiments, the groove or ridge may according to a further development be shaped slightly curved in axial direction, such that a slight amount of rocking movement about a central part of the contacting faces 31, 32, 36, 37 is allowed. It is preferred according to the invention however, to minimise this rotational tendency of elements entering a pulley by minimising at least at one spot, the radial play of a carrier within a receiving slot. However with the measure according to the invention, this play may be significantly larger than in conventionally shaped elements. Thus the invention allows one type of element 8, 30, 35 to be used in conjunction with carriers of different thickness, reducing the production costs of the belt. Such play should according to the invention be between 1.05 and 2.0 times the thickness of a carrier. In a preferred embodiment the minimal slot height is within the range of the thickness of a carrier 7 plus or minus 0.4 mm maintaining the advantage of, at impacting on a sheave, to move axially rather than to rotate, or alternatively denoted, the reduction of belt sensitivity for misalignment. The described axial rounding of the contact surfaces 31–34 and 36, 37 and the allowance of a slight amount of rocking or rotating movement of the element 30, 35 enhances the distribution of local pressure by an element on the carrier 7.

The amount of play according to a preferred embodiment of the invention is set to the most upper region of a range of amounts S of skewing as may typically be expected in automotive applications. The maximum amount of skewing S in a transmission is determined by the distance L between pulleys, the occurring contacting radii between belt and pulley, and by the conus angle α of a pulley, as is e.g. known from patent publication U.S. Pat. No. 4,546,536. According to this document the amount of skewing in the worst case is determined by the formula $$S := \frac{D^2}{\pi L} \cdot \left(\frac{E-1}{E+1}\right)^2 \cdot \tan(\alpha)$$

where:
S is the amount of skewing, alternatively denoted misalignment, of the belt assembly in mm;
D is the diameter of the curved runs of the belt in the standard unity transmission ratio position (E=1);
L is the perpendicular distance between the driving and driven shaft Ap and As;
E is the current transmission ratio, alternatively denote I; and
α is the half-angle of the V-shaped groove of the pulley assemblies.

Typically, L is in automotive applications as short as possible for saving constructional space. Thus, L often approaches the maximum diameter of a sheave. The maximum diameter of a sheave depends on the maximum transmission ratio i, i.e. the rotational speed of the secondary shaft divided by the rotationed speed of the primary shaft, and typically is within the range 0.4 to 2.7. The angle conus α finds its maximum at eleven degrees. Thus by choosing a figure from the upper range of maximum ratios usually to be expected in auto-motives, and by choosing the lower region of typical distances L, a cost effective value for maximal amount of play Pa is according to the invention reached. Such embodiment is cost-effective since it can according to the invention be used in wide range of applications, based on the insight that at larger distances L, or at smaller maximum ratio's E the maximum amount of skewing S, and therewith the impact of an element on a sheave remains low. More in particular such optimised amount of maximal play Pa is given by the formula Pa=B×S where according to the invention 0.2<B<0.7, preferably close to the value B=0.4.

What is claimed is:
1. Drive belt (6) for use in a continuously variable transmission with a driving shaft (AP) and a driven shaft (As), each shaft being provided with a pulley (3; 5) having two sheaves (9, 10) with a pulley surface (21), whereby the pulley surfaces (21) of the two pulleys (3; 5) are mutually oriented at an angle thereby defining a V-shaped groove, said drive belt (6) comprising a plurality of transverse elements (8) carried by at least one endless
   carrier (7a, 7b) comprising at least one endless band, received in a receiving slot (18, 15, 13, 17) provided for said band in said element (8), the slot (18, 15, 13, 17) allowing relative axial play (Pa) between said element (8) and said band relative to the predominant longitudinal direction of the belt (6), characterized in that the axial play (Pa) is of a value between 0.2 and 0.95 times the maximum amount of misalignment defined for the belt (6), indicated in amount of lateral displacement (S) determined by a skewing formula:

$$S := \frac{D^2}{\pi L} \cdot \left(\frac{E-1}{E+1}\right)^2 \cdot \tan(\alpha)$$

wherein:
   D is a diameter of a curved run of the drive belt (6) when contacting the pulley surfaces (21) of the pulleys (3; 5) at unity transmission ratio (E=1) L is a perpendicular distance between the driving shaft A and the driven shaft As;
   E is the transmission ratio of the transmission; and
   $\alpha$ is half the angle of the V-shaped groove defined by the pulley surfaces (21).

2. Drive belt (6) as claimed in claim 1, characterised in, that the axial play (Pa) is less than 0.7 times the maximum amount of misalignment.

3. Drive belt (6) as claimed in claim 1, characterised in, that the axial play (Pa) is value between 0.35 and 0.45 times the maximum amount of misalignment defined for the belt (6), indicated in amount of lateral displacement (S).

4. Drive belt (6) as claimed in claim 1, characterised in, that the axial play (Pa) between carrier (7) and element part (13, 14, 18) is less than 1.2 mm and more than 0.2 mm.

5. Drive belt (6) according to claim 1, characterised in, that the belt (6) is embodied with a single carrier (7) received in a single recess (15, 18, 22, 18) therefor.

6. Drive belt (5) according to claim 1, characterized in that the axial play of a carrier (7) is a factor A times the skewing formula S, where A is between 0.2 and 1.2.

7. Drive belt (6), according to claim 1 characterised in, that an element (30,35) is provided with an axially extending protruding contacting surface (31–34, 36, 37) for radial positioning the element (30,35) relative to a neighbouring element (30, 35).

8. Drive belt according to claim 1, characterised in, that a radial play of a carrier within a receiving slot of an element (8, 30, 35) i.e. a minimal height of a slot is more than 1.05 and less than 2.0 times the thickness of a carrier (7).

9. Drive belt (6) according to claim 3, characterised in, that the axial play (Pa) between carrier (7) and element part (13, 14) is less than 0.5 mm and more than 0.2 mm.

10. Drive belt (6) according to claim 9, characterised in, that the carrier (7) is received between two upwardly extending walls 18 of the recess (15, 18, 22, 18).

11. Drive belt (6) according to claim 9, characterised in, the axial play (Pa) is less than 2.0 and more than 0.2 mm.

12. Drive belt (6) according to claim 11, characterised in that the factor A is a value between or corresponding to 0.2 and 0.7.

13. Drive belt (6) according to claim 6, characterised in that the axial play (Pa) of the carrier (7) is within a range determined by the skewing formula S and the factor A, where A has a value between 0.2 and 0.4.

14. Drive belt (6) according to claim 13, characterized in that a contacting surface (31–34, 36, 37) is shaped for allowing a slight rotational rocking movement of each transverse element (30, 35) around an axis aligned with the predominant longitudinal direction of the belt.

15. Drive belt according to claim 14, characterised in, that a minimal slot height is within range of the thickness of a carrier (7) plus or minus 0.4 mm.

16. Variator set comprising a pair of pulleys (5) and a drive belt (6) for mounting between said pulleys (5), each of the pair of pulleys (3; 5) having two sheaves (9, 10) with a pulley surface (21), whereby the pulley surfaces (21) of the two pulleys (3; 5) are mutually oriented at an angle thereby defining a V-shaped groove, said drive belt (6) comprising a plurality of transverse elements (8) carried by at least one endless carrier (7a, 7B) comprising at least one endless band, received in a receiving slot (18, 15, 13, 17) provided for said band in said element (8), the slot (18, 15, 13, 17) allowing relative axial play (Pa) between said element (8) and said band relative to the predominant longitudinal direction of the belt (6), characterized in that the axial play (Pa) is of a value between 0.2 and 0.95 times the maximum amount of misalignment defined for the belt (6), indicated in amount of lateral displacement (S) determined by a skewing formula:

$$S := \frac{D^2}{\pi L} \cdot \left(\frac{E-1}{E+1}\right)^2 \cdot \tan(\alpha)$$

wherein:
   D is a diameter of a curved run of the drive belt (6) when contacting the pulley surfaces (21) of the pulleys (3; 5) at unity transmission ratio (E=1) L is a perpendicular distance between the driving shaft Ap and the driven shaft As;
   E is the transmission ratio of the transmission; and
   $\alpha$ is half the angle of the V-shaped groove defined by the pulley surfaces (21).

17. Transmission comprising a drive belt (6), a driving shaft (Ap) and a driven shaft (As), each shaft being provided with a pulley (3; 5) having two sheaves (9, 10) with a pulley surface (21), whereby the pulley surfaces (21) of the two pulleys (3; 5) are mutually oriented at an angle thereby defining a V-shaped groove, said drive belt (6) comprising a plurality of transverse elements (8) carried by at least one endless carrier (7a, 7B) comprising at least one endless band, received in a receiving slot (18, 15, 13, 17) provided for said band in said element (8), the slot (18, 15, 13, 17) allowing relative axial play (Pa) between said element (8) and said band relative to the predominant longitudinal direction of the belt (6), characterized in that the axial play (Pa) is of a value between 0.2 and 0.95 times the maximum amount of misalignment defined for the belt (6), indicated in amount of lateral displacement (S) determined by a skewing formula:

$$S := \frac{D^2}{\pi L} \cdot \left(\frac{E-1}{E+1}\right)^2 \cdot \tan(\alpha)$$

wherein:
   D is a diameter of a curved run of the drive belt (6) when contacting the pulley surfaces (21) of the pulleys (3; 5) at unity transmission ratio (E=1) L is a perpendicular distance between the driving shaft Ap and the driven shaft As;
   E is the transmission ratio of the transmission; and
   $\alpha$ is half the angle of the V-shaped groove defined by the pulley surfaces (21).

18. Transmission of claim 17, further comprising a variator set.

* * * * *